April 2, 1968  J. DUNGLER  3,375,638
APPARATUS FOR PURIFICATION OF GASES
Filed Aug. 29, 1963

INVENTOR
Julien Dungler
Bauer and Seymour
ATTORNEY

United States Patent Office 3,375,638
Patented Apr. 2, 1968

3,375,638
APPARATUS FOR PURIFICATION OF GASES
Julien Dungler, Basel, Switzerland, assignor to
K. E. Merckle, Bad Friedrichhall, Germany
Filed Aug. 29, 1963, Ser. No. 308,615
Claims priority, application France, Aug. 29, 1962,
908,064
7 Claims. (Cl. 55—116)

The invention concerns an apparatus for purification of gases, especially exhaust gases of industrial plants by means of movable filters placed transversely to the stream of gas to be purified; the filters must be gas-permeable.

There are filter plants known which serve for the purification of the exhaust gases of the industry. On account of the construction and arrangement of the structural filter members used with smooth surfaces, up to now it was impossible to collect all particles floating in the air. But for the process of purification of air it is very important to eliminate all airborne particles of mineral, vegetable, animal, or chemical kind. These particles, the size is less than .002 mm., are the most numerous and the most dangerous in the atmosphere, as they float in the air owing to their slight dimensions and weight. Furthermore the filtering organs along the windpipe provided in the human organism by nature are not in a position to collect the tiny particles, so that there can be detrimental consequences.

The object of the invention is to create an apparatus for the purification of gases by which even the smallest particles can be eliminated and by which simultaneously the toxic ingredients can be rendered harmless by means of an oxidation process, for example from carbon monoxide into carbon dioxide. This goal is achieved according to this invention by filters, which are led along electrostatically charged, fixed, gas-permeable structural members and are thereby electrostatically charged.

Conforming to further characteristics of the invention the filters can be constructed as movable endless belts and led over rolls placed at the side outside the filter chamber. The electrostatically charged members are plate-like and extend almost over the whole surface of the filter within the filter chamber. To increase the purifying effect, ozone or ultraviolet radiation producers can be incorporated. The cleaning of the movable filters can be carried out continuously and automatically. In this way the operation is not interrupted.

The functions of the invented apparatus are shown by the following figures.

Figure 1:
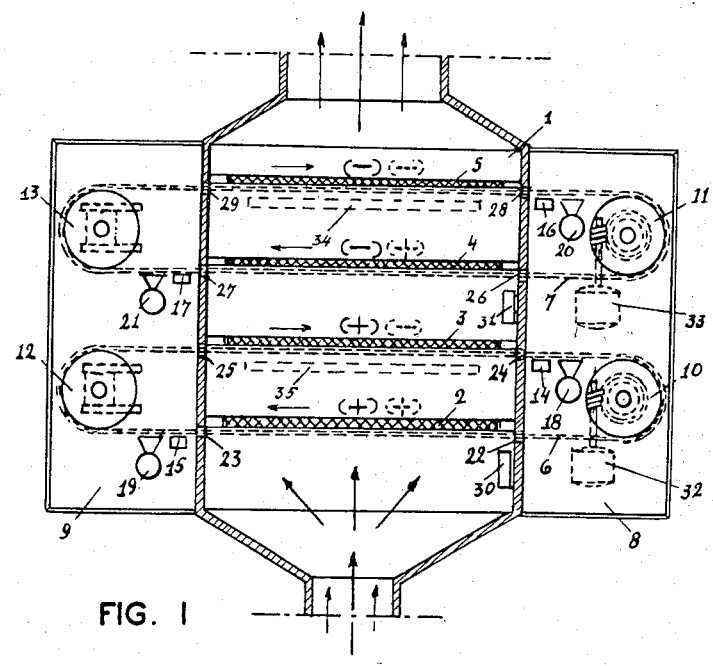
FIG. 1 is a schematic section of the apparatus according to the invention.
Figure 3:
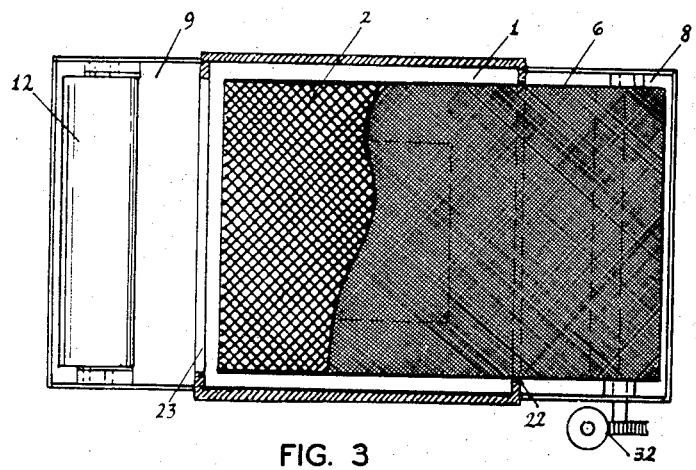
FIG. 3 is a sectional bottom view, with parts broken away, of the apparatus according to FIG. 1, the section being substantially in a horizontal plane below belt 6 in FIG. 1.

The appliance for the purification of gases conforming to the invention has according to FIGURES 1 and 3 a filter chamber 1. The gases to be purified can enter the lower and leave the upper part. Within the filter chamber 1 the structural members 2, 3, 4 and 5, permeable to gas and arranged plate-like, are fixed. These members are under a voltage between 5 and 10,000 volts under normal conditions. This voltage is obtained from the power line by means of a transformer and a rectifier. The voltage may be varied on demand. The structural members 2, 3, 4 and 5 may be constructed of metal or non-metallic materials. The latter may be metallized on the surface or may contain metallic parts. The construction of the members 2, 3, 4 and 5 may be in shape of lattice or perforated. Also material with natural porosity can be used.

Along the fixed members 2, 3, 4 and 5 filters 6 and 7 are led along. By preference the latter are constructed as movable, endless belts and pass through the filter chamber transversely of the stream of gas, so that the gases to be purified have to stream through the belts. The filters 6 and 7 may be made of textile, glass or synthetic fibers. It is also possible to arrange one or several filters one behind the other in the direction of the flow of the gases, which filters may be composed of different materials. During the operation the filters 6 and 7 can touch the members 2, 3, 4 and 5 or pass at a short distance. Thereby they are highly electrostatically charged. The filters 6 and 7 pass through the slots 22, 23, 24, 25, 26, 27, 28, and 29 in the side walls into the cleaning chambers 8 and 9 which are fixed on both sides of the filter chamber 1.

Immediately after the entering into the cleaning chambers 8 and 9 the filters 6 and 7 are exposed to the effect of a known neutralizing apparatus 14, 15, 16 and 17 so that the filters can be cleaned after neutralization. The cleaning can be effected by the suction plants 18, 19, 20 and 21 which suck off the solid dust particles which passed through the filter chamber 1. Of course, it is possible to complement or replace the suction plant by a mechanism which blows towards the filters to be cleaned such gaseous mediums as, for example, air or wet steam or superheated steam. Also a brushing or washing appliance can be used. Instead of a neutralizing apparatus 14, 15, 16 and 17 there might be made use of an attachment which effects the re-entrainment of the filter surface.

After cleaning, the filters 6 and 7 are turned round over the rolls 10, 11, 12 and 13 in order to enter the filter chamber 1 and to pass through again. The drive of rolls 10, 11, 12 and 13 may be effected by electromotors 32 and 33 over worm drives and gear wheels or similar mechanisms which drive the rolls 10 and 11. It is possible to place the rolls 12 and 13 in such a way that they can be shifted so that they can be used as stretching devices for the filters 6 and 7.

The velocity of the filters 6 and 7 can be automatically regulated depending on the tightness of the surfaces or porosity of the filters 6 and 7. For this purpose manometers 30 and 31 are provided which measure the static pressure on the front of the filter surface. As long as these front surfaces are not yet wholly covered with dust or the present degree of tightness i.e., porosity, admits the normal flow of gas through filters 6 and 7, the velocity of the corresponding filter remains the same. An increase of the static pressure shows an increase of the degree of tightness, i.e. the flow of gas through the filter is reduced. An increase of the static pressure results in an acceleration of the filter. The contrary effect is produced if the static pressure falls under the value determined.

According to the requirements in the filter chamber 1 attachments can be provided which achieve an additional effect for the cleaning process, such as the oxidation of certain poison gases, or sterilization for the destruction of micro-organisms. For this purpose ozone or ultraviolet radiation producers 34 and 35 can be installed in the filter chamber 1.

Figure 2:
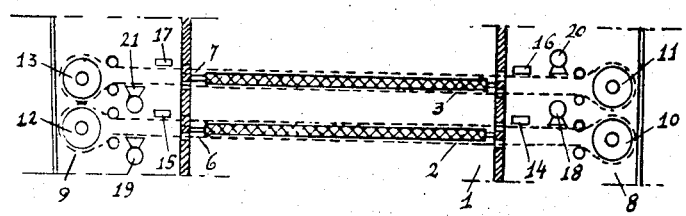
FIG. 2 is a view similar to FIG. 1 showing part of another kind of the invented apparatus.

A further development of the inventor's idea is shown in FIG. 2 wherein each endless filter (6 and 7) slides along the two opposed surfaces of one of the electrostatically charged members 2 and 3. By means of this arrangement it is possible to reduce the volume of the filter chamber 1.

What is claimed is:

1. Apparatus for filtering gases comprising means forming a filter chamber through which gases are flowed, an endless gas-permeable dielectric belt, a pair of spaced rolls movably supporting said belt with the reaches of the belt between the rolls extending across said chamber transversely of the flow of said gases, whereby the gases are compelled to flow through the reaches of the belt within the chamber, at least one of said rolls being mounted exteriorly of said chamber and the reaches of the belt passing through openings in the wall of the chamber, at least one gas-permeable, plate-like electrode fixedly mounted in said chamber and extending transversely of the flow of the gases with a broad surface thereof closely adjacent a broad surface of at least one reach of said belt, means for driving at least one of said rolls to move the reaches of said belt parallel and relative to the broad surfaces of the electrode, a source of dynamical electrical energy, means connecting the high potential terminal of said source to said plate to apply a potential to the latter to thereby electrostatically charge the reach of the belt adjacent thereto, whereby particles suspended in the gases flowing through the belt are attracted by the latter, means exteriorly of said chamber for neutralizing the electrostatic charge on the belt outside of the chamber, and means exteriorly of said chamber for removing said particles from the belt after neutralization of said electrostatic charge.

2. Apparatus as defined in claim 1 wherein said broad surfaces of said belt and said electrode are in engagement with each other.

3. Apparatus as defined in claim 1 wherein said electrode is adjacent the downstream surface of said adjacent reach of the belt, whereby the gases flow through the latter and said electrode in that order.

4. Apparatus for filtering gases comprising means forming a chamber through which gases are passed, filter means comprising a gas-permeable endless belt of electrically nonconductive material, a plurality of spaced rolls for mounting said belt with a plurality of reaches of the belt between the rolls extending across said chamber transversely of the flow of said gases, whereby the gases are compelled to flow through the belt, means for applying only a unipolarity electrostatic charge to at least one reach of the belt in said chamber, said last-named means comprising a gas-permeable, plate-like electrode fixedly mounted in said chamber and extending transversely of the flow of the gases with a broad surface thereof closely adjacent a broad surface of said one reach of the belt, a source of electrical energy and means connecting the high potential terminal of said source to said electrode to apply a potential to the latter to thereby impose an electrostatic charge on said one reach of the belt adjacent thereto, means for driving at least one of said rolls to move the reaches of said belt across said chamber parallel and relative to the broad surfaces of the electrode, means for mounting at least one of said rolls outside of said chamber, means for neutralizing the electrostatic charge on the belt after it emerges from said chamber, and means for removing dust and similar particles from the neutralized portion of the belt outside of the chamber.

5. Apparatus as defined in claim 4 wherein two reaches of said belt move with broad surfaces thereof in close proximity to the opposed broad surfaces of said plate-like electrode.

6. Apparatus as defined in claim 4 comprising one of said gas-permeable plate-like electrodes in close proximity to each of at least two reaches of said belt in said chamber, said two reaches being relatively widely separated in the direction of flow of the gases.

7. Apparatus as defined in claim 6 wherein one reach of the belt is charged to one polarity and the other reach of the belt is charged to the opposite polarity.

References Cited

UNITED STATES PATENTS

| 1,216,677 | 2/1917 | Feilmann et al. | 55—290 |
| 2,357,354 | 9/1944 | Penney | 55—107 |
| 2,486,877 | 11/1949 | Ransburg et al. | 55—116 |
| 2,934,648 | 4/1960 | Leupi et al. | 55—102 X |
| 3,008,541 | 11/1961 | Wachter | 55—114 X |
| 3,053,028 | 9/1962 | Kayko | 55—103 |
| 3,117,849 | 1/1964 | Selke | 55—149 X |
| 3,128,378 | 4/1964 | Allen et al. | |

FOREIGN PATENTS

| 92,636 | 5/1923 | Austria. |
| 424,834 | 2/1926 | Germany. |
| 435,574 | 3/1927 | Germany. |
| 452,437 | 11/1927 | Germany. |
| 794,038 | 4/1958 | Great Britain. |
| 41,136 | 3/1925 | Norway. |

HARRY B. THORNTON, *Primary Examiner.*

ROBERT F. BURNETT, *Examiner.*

D. E. TALBERT, JR., *Assistant Examiner.*